(12) United States Patent
Hwang et al.

(10) Patent No.: US 11,378,975 B1
(45) Date of Patent: Jul. 5, 2022

(54) AUTONOMOUS NAVIGATION TECHNOLOGY

(71) Applicant: Johns Hopkins University, Baltimore, MD (US)

(72) Inventors: Grace M. Hwang, Baltimore, MD (US); Kevin M. Schultz, Baltimore, MD (US); Robert W. Chalmers, Baltimore, MD (US); Joseph D. Monaco, Baltimore, MD (US); Kechen Zhang, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 420 days.

(21) Appl. No.: 16/734,294

(22) Filed: Jan. 3, 2020

Related U.S. Application Data

(60) Provisional application No. 62/845,957, filed on May 10, 2019, provisional application No. 62/787,891, filed on Jan. 3, 2019.

(51) Int. Cl.
| | | |
|---|---|---|
| *G05D 1/00* | (2006.01) | |
| *G05D 1/02* | (2020.01) | |
| *G06N 3/08* | (2006.01) | |
| *G06F 16/29* | (2019.01) | |

(52) U.S. Cl.
CPC .......... *G05D 1/0253* (2013.01); *G06F 16/29* (2019.01); *G06N 3/08* (2013.01)

(58) Field of Classification Search
CPC ......... G05D 1/0253; G06F 16/29; G06N 3/08
See application file for complete search history.

(56) References Cited

U.S. PATENT DOCUMENTS

| | | | |
|---|---|---|---|
| 9,488,981 B2 | 11/2016 | Pillai et al. | |
| 9,859,972 B2* | 1/2018 | Jalali | H04B 7/18504 |
| 11,046,517 B2* | 6/2021 | Elazary | B65G 1/1373 |
| | | | 700/213 |
| 2016/0378109 A1 | 12/2016 | Raffa et al. | |
| 2017/0123418 A1 | 5/2017 | Erickson et al. | |
| 2019/0166765 A1* | 6/2019 | Maor | A01D 46/30 |

(Continued)

OTHER PUBLICATIONS

Abbott et al., "Functional Significance of long-term potentiation for sequence learning and prediction," Cereb Cortex, May 1, 1996, 6:406-416.

(Continued)

*Primary Examiner* — Elaine Gort
*Assistant Examiner* — Brittany Renee Peko
(74) *Attorney, Agent, or Firm* — Fish & Richardson P.C.

(57) ABSTRACT

Methods, systems, and apparatus, including computer programs encoded on computer -storage media, for swarming technology. In some implementations, the system can be modeled on the spatial reasoning process found in rodents and other mammals. A plurality of synaptic weights can be formed within a neural network. The neural network along with additional data of a system can be used to determine motion vectors for one or more devices within a group of devices or swarm. The motion vectors can help determine where the devices within a group of devices are located at a given time. Motion vectors can direct devices to areas of high activity in a similar manner to how spatial cells in a brain direct animals in accordance with high activity rates of particular cells within their brain.

20 Claims, 5 Drawing Sheets

(56) References Cited

U.S. PATENT DOCUMENTS

| | | | |
|---|---|---|---|
| 2020/0133256 A1* | 4/2020 | Celia | G05B 23/0294 |
| 2021/0369373 A1* | 12/2021 | Zhang | A61B 34/73 |
| 2022/0072706 A1* | 3/2022 | Wagner | B25J 9/1664 |

OTHER PUBLICATIONS

Acharya et al.,. "Causal influence of visual cues on hippocampal directional selectivity," Cell, 2016, 164(1-2):197-207.

Amini et al., "Calcium dynamics underlying pacemaker-like and burst firing oscillations in midbrain dopaminergic neurons: a computational study," Journal of Neurophysiology, 1999, 82(5):2249-2261.

Bi et al., "Synaptic modifications in cultured hippocampal neurons: dependence on spike timing, synaptic strength, and postsynaptic cell type," Journal of Neuroscience, Dec. 15, 1998, 18(24):10464-72.

Blair et al., "Conversion of a phase- to a rate-coded position signal by a three-stage model of theta cells, grid cells, and place cells," Hippocampus, 2008, 18(12), 1239-55.

Blair et al., "Oscillatory neurocomputing with ring attractors: a network architecture for mapping locations in space onto patterns of neural synchrony," Philosophical Transactions of the Royal Society B: Biological Sciences, Feb. 5, 2014, 369(1635), 12 pages.

Bolding "Place cell firing cannot support navigation without intact septal circuits," Hippocampus, Mar. 2020, 30(3):175-91.

Brandon et al. "Segregation of cortical head direction cell assemblies on alternating theta cycles," Nature Neuroscience, Jun. 2013, 16(6):739-48.

Brandon et al., "New and distinct hippocampal place codes are generated in a new environment during septal inactivation," Neuron, 2014, 82(4):789-796.

Brandon et al., "Reduction of theta rhythm dissociates grid cell spatial periodicity from directional tuning," Science, Apr. 29, 2011, 332(6029):595-9.

Brette et al., "Philosophy of the spike: Rate-based vs. spike-based theories of the brain," Frontiers in Systems Neuroscience, Nov. 10, 2015, 9(151):1-14.

Burak et al., "Accurate path integration in continuous attractor network models of grid cells," PLoS Computational Biology, Feb. 2009, 5(2), 17 pages.

Burgess et al., "An Oscillatory Interference Model of Grid Cell Firing," Hippocampus, 2007, 17:801-812.

Burgess et al., "Controlling phase noise in oscillatory interference models of grid cell firing," Journal of Neuroscience, Apr. 30, 2014, 34(18):6224-32.

Burgess, "Grid cells and theta as oscillatory interference: theory and predictions," Hippocampus, Dec. 2008, 18(12):1157-74.

Bush et al., "A hybrid oscillatory interference/continuous attractor network model of grid cell firing," Journal of Neuroscience, 2014, 34(14):5065-79.

Buzsáki, et al., "Hippocampal evoked potentials and eeg changes during classical conditioning in the rat," Electroencephalogr and Clinical Neurophysiol, Jul. 1, 1979, 47(1):64-74.

Carpenter et al., "Grid cells form a global representation of connected environments," Current Biology, May 4, 2015, 25(9):1176-82.

Chen et al., "Absence of visual input results in the disruption of grid cell firing in the mouse," Current Biology, Sep. 12, 2016, 26(17):2335-42.

Climer et al., "Phase coding by grid cells in unconstrained environments: two-dimensional phase precession," European Journal of Neuroscience, Aug. 2013, 38(4):2526-41.

Csicsvari et al., "Reliability and state dependence of pyramidal cell-interneuron synapses in the hippocampus: an ensemble approach in the behaving rat," Neuron, Jul. 1, 1998, 21(1):179-89.

Deshmukh et al., "Representation of non-spatial and spatial information in the lateral entorhinal cortex," Frontiers in Behavioral Neuroscience, Oct. 28, 2011, 5:69, 33 pages.

Deshmukh et al., "Theta modulation in the medial and the lateral entorhinal cortices.," Journal of Neurophysiology, Aug. 2010, 104(2):994-1006.

Dolleman-Van Der Weel et al., "Projections from the nucleus reuniens thalami to the entorhinal cortex, hippocampal field CA1, and the subiculum in the rat arise from different populations of neurons," Journal of Comparative Neurology, Jan. 22, 1996, 364(4):637-50.

Dragoi et al., "Temporal encoding of place sequences by hippocampal cell assemblies," Neuron, Apr. 6, 2006,50(1):145-57.

Eliav et al., "Nonoscillatory phase coding and synchronization in the bat hippocampal formation," Cell, Nov. 1, 2018, 175(4):1119-30.

Etienne et al., "Resetting the path integrator: a basic condition for route-based navigation," Journal of Experimental Biology, Apr. 1, 2004, 207(9):1491-508.

Feng et al., "Dissociation between the experience-dependent development of hippocampal theta sequences and single-trial phase precession," Journal of Neuroscience, Mar. 25, 2015, 35(12):4890-902.

Foster et al., "Hippocampal theta sequences," Hippocampus, Nov. 2007, 17(11):1093-9.

Fuhrmann et al., "Locomotion, theta oscillations, and the speed-correlated firing of hippocampal neurons are controlled by a medial septal glutamatergic circuit," Neuron, Jun. 3, 2015, 86(5):1253-64.

Fuhs et al., "A spin glass model of path integration in rat medial entorhinal cortex," Journal of Neuroscience, Apr. 19, 2006, 26(16):4266-76.

Gerstner et al., "Neural codes: firing rates and beyond," Proceedings of the National Academy of Sciences, Nov. 25, 1997, 94(24):12740-1.

Gil et al., "Impaired path integration in mice with disrupted grid cell firing," Nature Neuroscience, Jan. 2018, 21(1):81-91.

Golani, "The developmental dynamics of behavioral growth processes in rodent egocentric and allocentric space," Behavioural Brain Research, Jun. 1, 2012, 231(2):309-16.

Goodman et al., "Brian: a simulator for spiking neural networks in python," Frontiers in Neuroinfoimatics, Nov. 18, 2008, 2:5, 10 pages.

Gothard et al., "Dynamics of mismatch correction in the hippocampal ensemble code for space: interaction between path integration and environmental cues," Journal of Neuroscience, Dec. 15, 1996, 16(24):8027-40.

Hafting et al., "Microstructure of a spatial map in the entorhinal cortex," Nature, 2005, 436:801-806.

Hafting et al., "Hippocampus-independent phase precession in entorhinal grid cells," Nature, Jun. 2008, 453(7199):1248-52.

Hardcastle et al., "A multiplexed, heterogeneous, and adaptive code for navigation in medial entorhinal cortex," Neuron, Apr. 19, 2017, 94(2):375-87.

Hardcastle et al., "Environmental boundaries as an error correction mechanism for grid cells," Neuron, May 6, 2015, 86(3):827-39.

Harris et al., "Spike train dynamics predicts theta-related phase precession in hippocampal pyramidal cells," Nature, Jun. 2002, 417(6890):738-41.

Harvey et al., "Intracellular dynamics of hippocampal place cells during virtual navigation," Nature, Oct. 2009, 461(7266):941-6.

Hasselmo et al., "A model combining oscillations and attractor dynamics for generation of grid cell firing," Frontiers in Neural Circuits, May 28, 2012, 6:30, 13 pages.

Hasselmo et al., "Grid Cell Firing May Arise From Interference of Theta Frequency Membrane Potential Oscillations in Single Neurons," Hippocampus, Dec. 2007, 17:1252-1271.

Hasselmo, "Grid cell mechanisms and function: contributions of entorhinal persistent spiking and phase resetting," Hippocampus, Dec. 2008, 18(12):1213-29.

Hinman et al., "Multiple running speed signals in medial entorhinal cortex," Neuron, Aug. 3, 2016, 91(3):666-79.

Huxter et al., "Independent rate and temporal coding in hippocampal pyramidal cells," Nature, Oct. 2003, 425(6960):828-32.

Huxter et al., "Theta phase-specific codes for two-dimensional position, trajectory and heading in the hippocampus," Nature Neuroscience, May 2008, 11(5):587-94.

(56) References Cited

OTHER PUBLICATIONS

Hwang et al., "Neuroinspired Algorithms for Swarming Applications," John Hopkins Univ., Oct. 2019, 2 pages.

Issa et al., "Universal conditions for exact path integration in neural systems," Proceedings of the National Academy of Sciences, Apr. 24, 2012, 109(17):6716-20.

Izhikevich, "Simple model of spiking neurons," IEEE Transactions on Neural Networks, Nov. 2003, 14(6):1569-72.

Jeewajee et al., "Theta phase prcession of grid and place cell firing in open environments," Philos Trans. R. Soc. Lond. B. Biol. Sci., 2014, 369(1635)::20120532, doi.

Jeffery et al., "Medial septal control of theta-correlated unit firing in the entorhinal cortex of awake rats," Neuroreport, Nov. 1995, 6(16):2166-70.

Jensen et al., "Hippocampal CA3 region predicts memory sequences: accounting for the phase precession of place cells," Learning & Memory, Sep. 1996, 3(2-3):279-87.

Jensen et al., "Position reconstruction from an ensemble of hippocampal place cells: contribution of theta phase coding," Journal of Nemophysiology, May 1, 2000, 83(5):2602-9.

Johnson et al., "Neural ensembles in CA3 transiently encode paths forward of the animal at a decision point," Journal of Neuroscience, Nov. 7, 2007, 27(45):12176-89.

Kamondi et al., "Theta oscillations in somata and dendrites of hippocampal pyramidal cells in vivo: activity-dependent phase-precession of action potentials," Hippocampus, 1998, 8(3):244-261.

Kempter et al., "Quantifying circular-linear associations: Hippocampal phase precession," Journal of Nemoscience Methods, May 30, 2012, 207(1):113-24.

Knierim et al., "Interactions between idiothetic cues and external landmarks in the control of place cells and head direction cells," Journal of Nemophysiology, Jul. 1, 1998, 80(1):425-46.

Koenig et al., "The spatial periodicity of grid cells is not sustained during reduced theta oscillations," Science, 2011, 332(6029):592-595.

Kropff et al., "Speed cells in the medial entorhinal cortex,". Nature, 2015, 523:419-424 [Epub ahead of print], doi: 10.1038/nature14622.

Krupic et al., "Grid cell symmetry is shaped by environmental geometry," Nature, 2015, 518:7538:232-5.

Langston et al., "Development of the spatial representation system in the rat," Science, 2010, 328(5985), 1576-80.

Lee et al., A double dissociation between hippocampal subfields: differential time comse of CA3 and CA1 place cells for processing changed environments,: Neuron, 2004, 42(5):803-8015.

Lengyel et al., "Dynamically detuned oscillations account for the coupled rate and temporal code of place cell firing," Hippocampus, 2003, 13(6):700-714.

Leranth et al., "The entorhino-septo-supramammillary nucleus connection in the rat: morphological basis of a feedback mechamsm regulating hippocampal theta rhythm," Neuroscience, 1999, 88(3):701-718, doi: 10.1016/S0306-4522(98)00245-0.

Leutgeb et al., "Context-specific spatial representations by lateral septal cells," Neuroscience, 2002, 112(3):655-663.

Lever et al., "Boundary vector cells in the subiculum of the hippocampal formation,". J Neurosci, 2009, 29(31):9771-7.

Levy et al., "A sequence predicting CA3 is a flexible associator that learns and uses context to solve hippocampal-like tasks," Hippocampus, 1996, 6(6):579-590.

Levy et al., "Interpreting hippocampal function as recoding and forecasting," 2005, Neural Netw, 18(9), 1242-64.

Levy et al., "Temporal contiguity requirements for long-term associative potentiation/depression in the hippoampus," Neuroscients, 1983, 8(4):791-797.

Lisman, "Bursts as a unit of nemal information: making unreliable synapses reliable," Trends Neurosci, 1997, 20(1), 38-43.

Luo et al., "Linking context with reward: a functional circuit from hippocampal CA3 to ventral tegmental area.," Science, 2011, 333(6040), 353-7.

Magee et al., "Dendritic mechamsms of phase precession in hippocampal CA1 pyramidal neurons," J. Neurophysicol, 2001, 86(1):528-832.

McKenna et al., "Afferent projections to nucleus reuniens of the thalamus," J. Comp. Neurol., 2004, 480(2):115-142.

McNaughton et al., "Path integration and the neural basis of the 'cognitive map'," Nat Rev Neurosci,2006, 7, 663-678.

Mehta et al., "Experience-dependent asymmetric shape of hippocampal receptive fields," Neuron, 2000, 25(3):707-715.

Mehta et al., "Experience-dependent, asymmetric expansion of hippocampal place fields," Proc Natl Acad Sci., 1997, 94(16), 8918-21.

Mehta et al., "Role of experience and oscillations in transforming a rate code into a temporal code," Nature, 2002, 417(6890):741-6.

Mizuseki et al., "Theta oscillations provide temporal windows for local circuit computation in the entorhinal-hippocampal loop," Neuron, 2009, 64(2):267-280, doi:10.1016/j.neuron.2009.08.037.

Monaco et al., "Attentive scanning behavior drives one-trial potentiation of hippocampal place fields," Nat Neurosci, 2014, 17(5):725-731.

Monaco et al., "Cognitive swarming: An approach from the theoretical neuroscience of hippocampal function," Proc.SPIE 10982,2019, 11 pages.

Monaco et al., "Sensory feedback, error correction, and remapping in a multiple oscillator model of place-cell activity," Front Comput Neurosci, 2011, 5:39.

Monaco et al., "Spatial synchronization codes from coupled rate-phase neurons," PLOS Computational Biology, 2018, 40 pages.

Monaco et al., "Spatial Theta Cells in Competitive Burst Synchronization Networks: Reference Frames from Phase Codes," bioRxiv, 2017, 67 pages.

Monaco et al., T-maze training of a recurrent CA3 model reveals the necessity of novelty-based modulation of LTP in hippocampal region CA3 In: Proc Int Joint Conf Neural Netw. Portland, OR IEEE/ 2003, 1655-1660.

Moser et al.,"A metric for space," Hippocampus, 2008, 18(12), 1142-56.

O'Keefe et al., "Phase relationship between hippocampal place units and the EEG theta rhythm," Hippocampus, 1993, 3(3):317-30.

O'Keefe et al.,"Dual phase and rate coding in hippocampal place cells: theoretical significance and relationship to entorhinal grid cells," Hippocampus, 2005, 15, 853-866.

O'Keefe et al., The hippocampus as a spatial map: preliminary evidence from unit activity in the freely-moving rat, Brain Res. 1971, 34(1):171-175.

Perkel et al., "Neural Coding—A report; based on an NRP .work session," Brookline, MA: Neuroscience Research Program; 1968, 19690022317.

Poll et al., "Sensory feedback in a bump attractor model of path integration," J. Comput. Neurosci, 2016, 40(2):137-155.

Reifenstein et al., "Grid Cells in rat entorhinal cortex encode physical space with independent firing fields and phase precession at the single-trail level," Proc. Natl. Acad. Sci. USA, 2012, 109(16):6301-6306.

Remme et al., "Democracy-independence trade-off in oscillating dendrites and its implications for grid cells," Neuron, 2010, 66(3):429-37.

Rennó-Costa et al., "Place and grid cells in a loop: Implications for memory function and spatial coding," J Neurosci, 2017, 37(34):8062-8076.

Risold et al., "Connections of the rat lateral septal complex," Brain Res. Brain Res Rev. 1997, 24(2-3):115-195.

Rossant et al., Sensitivity of noisy neurons to coincident inputs. J Neurosci, 2011,31(47), 17193-206. doi:.

Ruan et al.,. "Bi-directional theta modulation between the septo-hippocampal system and the mammillaiy area in free-moving rats," Front Neural Circuits, 2017, 11:62.

Sartor et al., "A septal-hypothalamic pathway drives orexin neurons, which is necessary for conditioned cocaine preference," Neurosci, 2012,32(13):4623-31.

Savelli et al., "Framing of grid cells within and beyond navigation boundaries," eLife, 2017, 6:e21354.

(56) References Cited

OTHER PUBLICATIONS

Savelli et al., "Influence of boundary removal on the spatial representations of the medial entorhinal cortex,". Hippocampus, 2008, 18(12):1270-1282.

Schnudt et al., "Single-trial phase precession in the hippocampus," J Neurosci, 2009, 29(42):13232-41.

Schmidt-Hieber et al., "Cellular mechanisms of spatial navigation in the medical entorhinal cortex," Nat. Neurosci, 2013, 16(3):325-331, doi:10.1038/nn.3340.

Skaggs et al., "An information theoretic approach to deciphering the hippocampal code," In Advances in neural infoimation processing systems,1993, 5:1030-1037, San Mateo, CA: Morgan Kaufman.

Skaggs et al., "Theta phase precession in hippocampal neuronal populations and the compression of temporal sequences," Hippocampus, 1996, 6(2):149-172.

Solstad et al., "Representation of geometric borders in the entorhinal cortex," Science, 2008,322(5909):1865-8.

Souza et al., "Asymmetry of the temporal code for space by hippocampal place cells," Scientific Reports, 2017, 7(1):8507.

Stensola et al., "Shearing-induced asymmetry in entorhinal grid cells," Nature, 2015, 518(7538), 207-12.

Takamura et al., "Spatial firing properties of lateral septal neurons. Hippocampus," 2006, 16(8):635-44.

Tingley et al., "Transformation of a Spatial Map across the Hippocampal-Lateral Septal Circuit," Neuron, 2018, 18(6):1229-1242.

Traub et al., "A model of a CA3 hippocampal pyramidal neuron incorporating voltage-clamp data on intrinsic conductances," J Neurophysiol, 66(2):635-50.

Tsanov et al., "Differential and complementary roles of medial and lateral septum in the orchestration of limbic oscillations and signal intergration," Eur. J. neurosci, 2017, doi: 10.0000/enj13746.

Tsanov et al., "Oscillatory entrainment of thalamic neurons by theta rhythm in freely moving rats," J Neurophysiol, 2011, 105(1):4-17.

Tsao et al.,"Traces of experience in the lateral entorhinal cortex," Curr Biol, 2013, 23(5):399-405.

Vertes et al., "Theta-rhythmically firing neurons in the anterior thalamus: implications for mnemonic functions of Papez's circuit," Neuroscience, 2001, 104(3):619-625.

Wallenstein et al., "GABAergic modulation of hippocampal population activity: sequence learning, place field development, and the phase precession effect," J Neurophysiol, 1997, 78(1):393-408.

Wang et al., "Theta sequences are essential for internally generated hippocampal firing fields," Nat Neurosci, 2015, 18(2):282-288.

Welday et al., "Cosine directional tuning of theta cell burst frequencies: evidence for spatial coding by oscillatory interference," 2011, J Neurosci, 31(45):16157-76.

Welinder et al., "Grid cells: the position code, neural network models of activity, and the problem of learning," Hippocampus, 2008, 18(12):1283-1300.

Widloski et al., A model of grid cell development through spatial exploration and spike time-dependent plasticity. Neuron, 2014, 83(2), 481-95.

Wikenheiser et al., "Hippocampal theta sequences reflect current goals," Nat. Neurosci, 2015, 18:280-294, doi:10.1038/nn.3909.

Williams et al., "Stimulation-induced reset of hippocampal theta in the freely performing rat," Hippocampus, 2003, 13(1), 109-16.

Wills et al., "Development of the hippocampal cognitive map in preweanling rats," Science, 2010, 328(5985), 1573-6.

Yartsev et al., "Grid cells without theta oscillations in the entorhinal cortex of bats," Nature, 2011, 479(7371): 103-107. doi: 10.1038/nature10583.

Zhang et al., Interpreting neuronal population activity by reconstruction: unified framework with application to hippocampalplace cells, J. Neurophysiol, 1998, 79(2):1017-1044.

Zhang et al., "Representation of spatial orientation by the intrinsic dynamics of the head-direction cell ensemble: a theory," J Neurosci, 1996,16(6):2112-26.

Zhou et al., "Comparison of medical and lateral septal neuron activity during performance of spatial tasks in rats," Hippocampus, 1999, 9(3):220-234.

Zilli et al., "Coupled noisy spiking neurons as velocity-controlled oscillators in a model of grid cell spatial firing," J Neurosci, 2010,30(41), 13850-60.

Zilli et al., "Evaluation of the oscillatory interference model of grid cell firing through analysis and measured period variance of some biological oscillators," PLoS Comput Biol, 2009, 5(11):e1000573.

Izhikevich et al., "Dynamical systems in neuroscience: The geometry of excitability and bursting," Cambridge, MA: MIT press, 2007, 210 pages.

Jakab, "The rat nervous system, Septum," In G. Paxinos, San Diego: Academic Press. 1995, pp. 405-442.

* cited by examiner

400

```
┌─────────────────────────────────────────────┐
│ FOR ONE OR MORE ROBOTS, DETERMINE A SYNAPTIC│
│ WEIGHT IN A NEURAL NETWORK WHICH REPRESENTS A│
│ DISTANCE FROM A ROBOT TO ANOTHER ROBOT   402│
└─────────────────────────────────────────────┘
                     ↓
┌─────────────────────────────────────────────┐
│ FOR ONE OR MORE ROBOTS, DETERMINE A SYNAPTIC│
│ WEIGHT IN THE NEURAL NETWORK WHICH REPRESENTS│
│ A DISTANCE BETWEEN THE ROBOT AND AN OBJECTIVE│
│                                          404│
└─────────────────────────────────────────────┘
                     ↓
┌─────────────────────────────────────────────┐
│   COLLECT PHASE INFORMATION OF THE ONE OR MORE│
│                  ROBOTS                  406│
└─────────────────────────────────────────────┘
                     ↓
┌─────────────────────────────────────────────┐
│ UPDATE THE SYNAPTIC WEIGHTS USING THE NEURAL│
│       NETWORK AND PHASE INFORMATION      408│
└─────────────────────────────────────────────┘
                     ↓
┌─────────────────────────────────────────────┐
│    BASED ON THE UPDATED SYNAPTIC WEIGHTS,   │
│   DETERMINE A MOTION VECTOR THAT DEFINES    │
│        MOVEMENT FOR THE ROBOT            410│
└─────────────────────────────────────────────┘
                     ↓
┌─────────────────────────────────────────────┐
│  ADJUST A CURRENT LOCATION OF THE ROBOT TO A│
│ SUBSEQUENT LOCATION BASED ON THE DETERMINED │
│            MOTION VECTOR                 412│
└─────────────────────────────────────────────┘
```

FIG. 4

AUTONOMOUS NAVIGATION TECHNOLOGY

CROSS-REFERENCE TO RELATED APPLICATION

This application claims the benefit of U.S. Provisional Application No. 62/787,891, filed on Jan. 3, 2019, and titled "Neuroinspired Algorithms For Swarming Applications" and U.S. Provisional Application No. 62/845,957, filed on May 10, 2019, and titled "Neuroinspired Algorithms For Swarming Applications." The disclosure of each application is hereby incorporated herein by reference in its entirety.

STATEMENT REGARDING GOVERNMENT SUPPORT

This invention was made with government support under Grant No. 1835279 awarded by the National Science Foundation. The government has certain rights in the invention.

BACKGROUND

This specification generally relates to swarming technology.

SUMMARY

According to one innovative aspect of the present disclosure, a method for decentralized robot swarm navigation is disclosed. The method can include actions of: for each particular robot of the swarm: determining a plurality of robot-based synaptic weights within a neural network, wherein each of the plurality of robot-based synaptic weights represent a distance based relationship between the particular robot and another robot of the swarm that is visible to the particular robot, determining a plurality of objective-based synaptic weights within the neural network, wherein each of the objective-based synaptic weights represent a distance based relationship between the particular robot and an objective, updating the plurality of robot -based synaptic weights and objective-based synaptic weights using the neural network and additional data, wherein the additional data is comprised of oscillating signals from at least one robot, determining a motion vector that defines movement for the particular robot based on the updated weights, and adjusting a current location of the particular robot to a subsequent location based on the determined motion vector.

Other versions include corresponding system, apparatus, and computer programs to perform the actions of methods defined by instructions encoded on computer readable storage devices.

These and other versions may optionally include one or more of the following features. For instance, in some implementations, another robot is visible to the particular robot of the robot swarm if electronic signals can be exchanged between the other robot and the particular robot. Alternatively, in such implementations, if the other robot cannot exchange electronic signals with the particular robot, the other robot can be considered not visible to the particular robot. Robot visibility can be used to determine aspects of the environment, the object, or the motion of robots within a group of robots.

In some implementations, a robot-based synaptic weight of the plurality of robot-based synaptic weights that represents a connection between the other robot and the particular robot can be added in instances where the other robot moves from being non-visible to the particular robot to visible to the particular robot and the robot-based synaptic weight can be deleted in instances where the other robot moves from being visible to the particular robot to non-visible to the particular robot.

In some implementations, the plurality of robot-based synaptic weights are stored within the particular robot of the swarm. For example, a particular robot within a group of robots can be connected to a data storage device. The data storage device can exist inside the particular robot, outside the particular robot, or as part of the particular robot. The data storage device can be used to store the synaptic weights of a neural network or data related to the synaptic weights of a neural network.

In some implementations, the particular robot can use data related to oscillating signals which are location independent. For example, an oscillating signal can be communicated by the particular robot to another robot or an oscillating signal can be communicated by other robot to the particular robot . In some cases, the oscillating signal can be used to calculate parameters related to motion, environment, or objectives. For example, the particular robot can receive an oscillating signal from another robot which is in phase with the oscillating signal from the particular robot. In some cases, the particular robot can calculate an attraction force based on the matching phase. The attraction force can then be used in a calculation of a motion vector which can direct the particular robot towards the other robot, the other robot towards the particular robot, or a combination thereof.

In some implementations, the phases of two or more oscillating signals can be compared in other ways. For example, an oscillating signal of a particular robot can be in phase with an oscillating signal of another robot which produces a repulsive force and subsequent motion vectors which direct the particular robot away from the other robot, the other robot away from the particular robot, or a combination thereof In some implementations, a location independent relationship can be used in determining weights within a neural network related to one or more robots within a group of robots. In some cases, a robot can calculate one or more weights based on oscillating signals from one or more other robots within a group of robots.

In some implementations, the method can further include determining, by the particular robot and using the determined motion vector, a path towards a most highly activated visible particle in a model that is internal to or computed on behalf of the particular robot. For example, autonomous drones can patrol a section of street and report to a robot which can use the data gathered from the autonomous drones to calculate a motion vector. In another example, a robot within a group of robots can use data signals from other robots within the group to construct a path towards highly activated visible particles.

In some implementations, a robot within a swarm can receive data from an entity outside of a swarm and then use the data in determining motion of the robot. A swarm can be a group of robots. For example, a stationary device in view of an autonomous robot, can communicate signals to the robot which help the robot detect the presence of the stationary device and help in calculating advantageous motion vectors for the autonomous robot. In another example, a central control station could send updates to a robot within a group of robots which impact resulting motion or task completion.

The details of one or more embodiments of the invention are set forth in the accompanying drawings and the descrip-

BRIEF DESCRIPTION OF THE DRAWINGS

FIG. 4 is a flow diagram illustrating an example of a process for swarming technology.

Like reference numbers and designations in the various drawings indicate like elements.

DETAILED DESCRIPTION

The approach to swarming technology can be modeled as mammalian brain circuits for spatial navigation. Data can be used within a neural network to determine motion vectors for one or more devices within a system. The swarming technology system can use aspects thought to contribute to the biological processes of spatial awareness such as a recently discovered neuron type, phaser cells, whose spatial activity can be characterized as a strong, symmetric coupling between firing rate and a spike phase relative to hippocampal theta oscillations. The multiple robots of a swarm can be thought of as a group of neurons in which specific patterns of neural activation and oscillation determine spatial properties which can then be used by the multiple robots to navigate within and between locations, whether previously explored or not. Other spatial neurons such as head direction cells, grid cells, velocity-controlled oscillators, border cells, or object-vector cells exhibit distinct spatial properties which can be incorporated to provide differing navigation characteristics.

In some implementations, a neuro-computational strategy can be used. For example, location-dependent synchrony can potentially reconcile internal self-motion signals with external reference points. The strategy can be extended to the problem of control of artificial robotic swarms. For example, a control unit or device within a swarm can assign an internal phase state which is communicated to local neighbors using low-bandwidth phase communication that may be based on either continuous signals akin to electrical field potentials or pulsatile patterns akin to phasic neuronal spiking.

The coupled spatial and phase dynamics of swarms with externally referenced sensory inputs recapitulate the flexible spatial synchronization patterns observed in phaser cell simulations. Swarming tasks can include target tracking, patrol, or obstacle avoidance. Swarming tasks can benefit from this neural control paradigm to qualitatively improve agility, efficiency, and resilience in unknown or complex environments. Aspects of a Hebbian form of learning can be used in which the correlated activation of pre- and post-synaptic neurons lead to a strengthening of a connection between two neurons.

Figure 1:
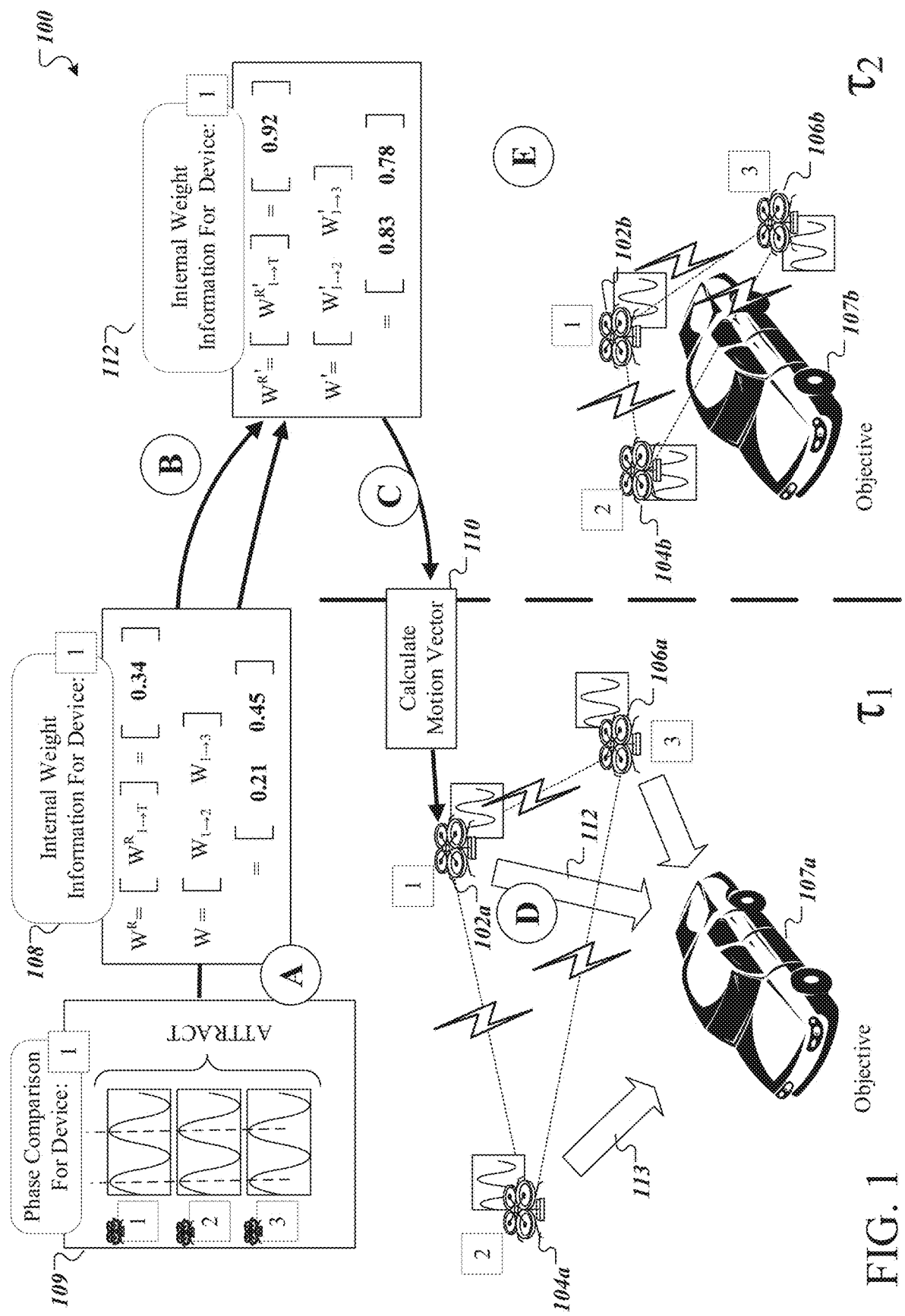
FIG. 1 is a diagram showing an example of a system for swarming technology.

FIG. 1 is a diagram showing an example of a system 100 for swarming technology. The system 100 is comprised of robots 102, 104, and 106, and an objective 107. The components of the system 100 are shown at time $\tau_1$ and time $\tau_2$.

The robots 102, 104, and 106 can store and process data as well as communicate with other devices. The robots can include, e.g., quadcopter drones that have navigation capabilities enabling flight. The robots can include one or more processors and one or more memories storing instructions. In some implementations, the memories can generate, store motion vectors generated by the robot, or other devices, that can processed by the robot's one or more processors and converted into instructions that cause the robot to navigate toward a particular direction, at a particular speed, at (or toward) a particular altitude, the like, or any combination thereof. However, the robots of the present disclosure are not limited to quadcopter drones, flying drones, or any other type of robot. Instead, for example, the robots of the present disclosure can include robots that have motors for ground or water navigation instead of flight capabilities. Accordingly, robots of the present disclosure can be configured to navigate on land, in water, in outer space, inside a human body, or the like.

In some cases, the other devices can help with storing and processing data. For example, item 108, the internal weight information for the robot 102, item 109, the phase comparison for the robot 102, or item 110, the calculation of a motion vector for the robot 102, can exist as variables or processes within the storage medium on board the robot 102. In some implementations, the items 108, 109, or 110, can exist as variables or processes within a storage medium of another device capable of communicating with the robot 102. For example, if a central station nearby can establish a network connection with the robot 102, the robot 102 could offload data or other information for the central station to process, generate, or manipulate the items 108, 109, 110. The central station, in this example, could send information to the robot 102 containing instructions or other data. For example, the central station could generate a motion vector 110 in accordance with aspects of the present disclosure, and then transmit the motion vector to the robot 102.

The robots 102, 104, and 106 can be configured to navigate towards an objective. For example, one or more of the robots 102, 104, and 106 can receive an instruction to navigate towards a particular location of a stationary objective. The instruction can include data exchanged from a robot to another robot, internal data within a robot, or data received from a non-robot entity (e.g. control station). In some implementations, a group of robots can be used within a search process for the objective. For example, a group of robots can implement a distributed self-organized exploration of an area. Based on the exploration, the group of robots can adjust navigation or motion. A stationary objective can include, for example, a house, a particular section of land, or any other location or stationary object. Such an implementation is described with reference to a stationary car in FIG. 1. In other implementations, an objective can be a moving object. For example, an objective could be a moving car on a roadway, a person walking down the street, a pet running in a field, a wild animal tagged with a location identifier, a flying airplane, a flying helicopter, another flying robot (e.g., an unmanned drone), a missile in flight, a satellite in orbit, or another moving object. With respect to an example of a moving object, in some implementations, the system 100 can interpret the moving objective as a series of stationary objectives with each objective in the series having a different location. Similarly, the system 100 could predict a direction of travel by, for example, extrapolating patterns of spatial synchrony and create an objective based on the predicted location of the objective. In some implementations, the system 100 can apply the same or similar processes to navigate towards an objective whether it is moving or stationary. For example, a robot within a system 100 can navigate towards a car which is stationary. The car can begin to move and the system 100 can automatically adapt and navigate the robot to the now moving car.

The particular method used to track an objective can depend on the nature of the objective's movement, the nature of the objective, or the like. For example, if an objective is moving slowly without other objects like trees or buildings blocking visibility from a robot to the objective, a system may use a series of objective locations, each updated after the objective moves. If an objective is moving often within tunnels, trees, buildings, or other objects which may obscure the objective's visibility from a robot, a system may choose to predict the location of a moving objective such that an objective going into a tunnel can be expected to arrive at the end of the tunnel in a time correlated with the length of the tunnel and the travel speed of the objective. In some implementations, a situation in which an objective is obscured from the view of a robot can be handled automatically by the system 100. For example, the one or more processes of the system 100 can be applied to the situation without further adjustment. Alternatively, or in addition, the method used to track an objective can depend on the nature of an assignment. For example, in a car chase, visibility of a car objective being chased can be of greater priority than swarming techniques that would be more appropriate for search or exploration. In some cases, this can make it more likely that at least one of the robots is maintaining visibility of the car objective.

With respect to the example of FIG. 1, the time $\tau_1$ corresponds to a time segment wherein the motion vector 112 is calculated for the robot 102. The time $\tau_2$ corresponds to a time segment after which the motion vector 112 is calculated for the robot 102. The process of updating motion vectors can be continuous as well as asynchronous. For example, the robot 102 can update the motion vector 112 and the robot 104 can independently update the motion vector 113 for the robot 104. In some implementations, a phase signal can be broadcast between two or more robots. The phase signal can be one of many phase signals broadcast and can encapsulate relevant situational information. The phase signal can be used to influence the motion of a member of the two or more robots.

In some implementations, other robots within the system 100 can update motion vectors in response to a determination, by the other robots, that a first robot updates a motion vector for the first robot. For example, if the robot 102 updates its motion vector, the robot 102, or other device, can broadcast a signal that is detected by the robot 104 and contains data indicating that the robot 102 updated a motion vector. Based on the broadcast data or other data, the robot 104 can then update its motion vector.

In some instances, the motion vectors of each first robot of a plurality of first robots can update their motion vector to account for movement of one or more other second robots that are visible to the first robot. A second robot can be visible to a first robot if the second robot is within a line of sight of the first robot. Whether a second robot is within line of sight of a first robot can be determined by the second robot obtaining one or more images using one or more cameras and analyzing, by the second robot, the one or more images to determine whether the images depict a robot. In other implementations, robot visibility can be achieved using RF communications instead of one or more cameras. For example, a second robot may be determined to be within line of sight of a first robot if the first robot and the second robot are within RF communication range of each other and can detect RF communications broadcast by the other robots. Such RF communications would include both phase information, in the oscillatory phase of the radio wave, and relative distance information, in the magnitude of signal attenuation relative to a common broadcast power.

By way of example, the robot 102 can asynchronously receive positional data broadcast by one or more other robots that are visible to robot 101, process the received data, and generate an updated motion vector. Similarly, the robots 104 and 106 can detect broadcast positional data indicative of robot 102's movement, process the detected broadcast positional data, and then generate respective motion vectors based on the processed data.

In other instances, the updating of motion vectors can be dissociated such that an update in one motion vector does not necessarily translate into an update of another motion vector for another robot unless the update in one motion vector changes the position and therefore the synaptic weights used to calculate the other motion vector for the other robot. For example, a movement of a first robot and updating of the first robot's motion vector will not cause a second robot to update the second robot's motion vector if the first robot is not visible to the second robot.

In stage A of FIG. 1, the item 108 and item 109 pertaining to the robot 102a are shown. The item 108 contains an objective-based matrix $W^R$ and a robot-based matrix W. The item 109 contains a phase comparison for robots 102a, 104a, and 106a within the system 100.

The objective-based matrix $W^R$ is a representation of the location of the robot 102a as it compares to the location of the objective 107a. The words 'objective' and 'reward' can be taken to refer to the same concept within the context of this application. In some implementations the calculation can be as follows:

$$W_{ik}^R = V_{ik}^R \exp(-D_{ik}^R/\kappa)$$

for the weight matrix $W^R \in \mathbb{R}^{N_S \times N_R}$, robot-reward visibility $V^R \in \{0,1\}^{N_S \times N_R}$, robot reward distances $D^R$, and spatial constant $\kappa$. The weight matrix $W^R \in \mathbb{R}^{N_S \times N_R}$ can be a matrix of values $W_{ik}^R$ which are associated with a distance from a robot to a reward and a visibility of the reward in a relation like the expression given above. Robot-reward visibility $V^R \in \{0,1\}^{N_S \times N_R}$ can be a matrix of values $V_{ik}^R$ which are associated with whether or not a robot can detect an objective. If a sensor on board a robot can detect an objective within a field of view, the matrix value associated with the robot, the objective, or the robot-reward visibility can be equal to 1. If no sensor on board the robot can detect the objective within the field of view, the matrix value associated with the robot, the objective, or the robot-reward visibility can be equal to 0. Robot reward distances $D^R$ can be a matrix of values $D_{ik}^R$ which are associated with a distance between a robot and an objective. The distance calculated between the robot and the objective can be saved as a value $D_{ik}^R$ within the matrix $D^R$. The spatial constant $\kappa$ can be used to tune the relation above for $W_{ik}^R$. The size $N_R$ can be defined as the number of objectives and $N_S$ can be defined as the number of robots in a swarm. The subscript i can represent a robot for which a weight value is calculated. The subscript k can be defined as an objective for which a weight value is calculated. An objective based weight can be implemented in a vectorized implementation like the above equation for $W_{ik}^R$. An objective based weight can also be implemented as a matrix of multiple values. For example, the item 108 in FIG. 1 shows a matrix $W^R \in \mathbb{R}^{N_R}$ where the number of values corresponds with the number of objectives $N_R$. Reward weights, or objective weights, can be scaled with distance according to an exponential kernel, a half-Gaussian kernel, or any other distance kernel function. The spatial constant κ can be made to adaptively scale to the local environment to modulate approach behaviors.

The robot-based matrix W is a representation of the location of the robot 102a with respect to the location of each of the other robots 104a and 106a that are visible to the robot 102a. In some implementations, the calculation can be as follows:

$$W_{ij} = V_{ij} \exp(-D_{ij}^2/\sigma^2)$$

for the weight matrix $W \in \mathbb{R}^{N_s \times N_s}$, inter-robot visibility $V \in \{0, 1\}^{N_s \times N_s}$, inter-robot distances D, and spatial constant σ. The weight matrix $W \in \mathbb{R}^{N_s \times N_s}$ can be a matrix of values $W_{ij}$ which are associated with a distance from a robot to another robot and a visibility of the other robot in a relation like the expression given above. Inter-robot visibility $V \in \{0, 1\}^{N_s \times N_s}$ can be a matrix of values $V_{ij}$ which are associated with whether or not a robot can detect another robot. If a sensor on board a robot can detect another robot within a field of view, the matrix value associated with the robot, the other robot, or that inter-robot visibility can be equal to 1. If no sensor on board the robot can detect the other robot within the field of view, the matrix value associated with the robot, the other robot, or that inter-robot visibility can be equal to 0. Inter-robot distances D can be a matrix of values $D_{ij}$ which are associated with a distance between a robot and another robot. The distance calculated between the robot and the other robot can be saved as a value $D_{ij}$ within the matrix D. The spatial constant a can be used to tune the relation above for $W_{ij}$. $N_S$ can be defined as the number of robots in a swarm. The subscript i can represent a robot for which a weight value is calculated. The subscript j can be defined as an other robot for which a weight value is calculated. An inter-robot weight can be implemented in a vectorized implementation like the above equation for $W_{ij}$. An inter-robot weight can also be implemented as a matrix of multiple values. For example, the item 108 in FIG. 1 shows a matrix $W \in \mathbb{R}^{N_S \times N_S}$ where the number of values corresponds with the number of robots $N_s$. Weights can be based on a half-Gaussian kernel, exponential kernel, or any other distance kernel function. The spatial constant σ can be made to adaptively scale to the local environment to modulate swarming behaviors.

As part of a calculation process, the robot 102a can define neuron like inputs. These neuron-like inputs can be modeled on aspects of the brain such as phaser cells like those within a mammal such as a rat. Phaser cells, found largely in the lateral septum and other subcortical regions (e.g., anteroventral thalamus, lateral hypothalamus, and nucleus accumbens), encode space by assigning distinct phases to isocontour levels of external spatial inputs. The system 100 provides a system that can achieve robot swarm navigation based on spatial relationships between robots using a neurocomputational strategy that is modeled on the spatial relationships used by phaser cells, in particular their place-cell like characteristics. In some cases, for example, spatial neurons and the firing fields associated with spatial neurons are mathematically similar to robots and their positions.

The system 100 can use input data within a neural network to direct swarms of robots. The input data can be used to weight connections within the neural network. In some implementations, the inputs can be separated into groups. For example, the system 100 can define cue inputs (representing aspects of the environment in which a robot exists and denoted by variable c), reward inputs (representing aspects of an objective for which a robot can be aiming and denoted by variable r), and recurrent swarming inputs (representing aspects of inter-robot movement and denoted by variable q).

In some implementations, the input data can include data representing cues that can be defined as $c \in \mathbb{R}^{N_s \times N_c}$ where $N_C$ can be defined as the number of cues. For example, the input representing cues can be used in the system 100 within the calculation:

$$\tau_c \dot{c}_{ik} = V_{ik}^c V_{ik}^{c^*} - c_{ik}$$

Robot-cue visibility can be represented by the matrix $V^c \in \{0,1\}^{N_s \times N_c}$, fixed robot-cue preferences can be represented by $V^{c^*} \in \{0,1\}^{N_s \times N_c}$, and an integration time-constant can be represented by $\tau_c$.

In some implementations, the input data can include data representing rewards that can be defined as $r \in \mathbb{R}^{N_s \times N_R}$. For example, the input representing rewards can be used in the system 100 within the calculation:

$$\tau_r \dot{r}_{ik} = V_{ik}^r - r_{ik}$$

Robot-reward visibility can be represented by the matrix $V^r \in \{0,1\}^{N_s \times N_c}$ and an integration time-constant can be represented by $\tau_r$. In some implementations, all robots can respond equally to all visible rewards. Visible rewards can be those rewards where $V_{ik}^r = 1$. In some implementations, a reward can serve as an objective for an assignment. For example, the objective 107a, 107b in FIG. 1 can be the reward within the calculations determining, in part, the movement for the robots 102a, 104a, and 106a as well as the robots 102b, 104b, and 106b. Though the objective is referred to as 107a, 107b, in FIG. 1, there is only one objective. 107a and 107b just refer to the objective at two different times $\tau_1$, $\tau_2$. In some implementations, there can be greater or fewer objectives than the one shown in 107a-107b.

In some implementations, the input data can include data representing recurrent swarming characteristics can be defined as $q \in \mathbb{R}^{N_s \times N_s}$. For example, the input representing recurrent swarming characteristics can be used in the system 100 within the calculation:

$$\tau_q \dot{q}_{ij} = V_{ij} \cos(\theta_j - \theta_i) - q_{ij}$$

Inter-robot visibility can again be represented by the matrix $V \in \{0,1\}^{N_s \times N_s}$ and an integration time-constant can be represented by $\tau_q$. In some implementations, both post-synaptic (e.g., data receiving) robots and pre-synaptic (e.g., data transmitting) robots can be represented. For example, the subscript i can represent post-synaptic robots while the subscript j can represent pre-synaptic robots. In some implementations, the robots 102, 104, and 106 can produce internal oscillatory signals represented by $\theta_i$ and $\theta_j$. These oscillatory signals can be globally generated (i.e., top-down or centralized) or locally generated (i.e., bottom-up or decentralized).

In the system 100, an internal phase state for each robot can be communicated to local neighboring robots. A local neighbor for a first robot can include any other robot that is visible to the first robot. In some implementations, the internal phase state for each robot can be determined using low-bandwidth communication that may be based on either continuous signals akin to electrical field potentials or pulsatile patterns akin to phasic neuronal spiking. The process of comparing phases is shown in item 109. In some implementations, when two or more internal signals of two or more robots are in phase, the two or more robots can be attracted to one another. For example, the relationship between phase and attraction can be of the following form:

$$\tau_q \dot{q}_{ij} = V_{ij} \cos(\theta_j - \theta_i) - q_{ij}$$

where $\theta_j$ and $\theta_i$ represent the phase of two robots. If they are equal the cosine term goes to positive one. If they are out of phase, the cosine term can decrease to negative one. In some implementations, when the cosine term is positive one from $\theta_i$ and $\theta_j$, the greatest attractive force between a robot with phase $\theta_i$ and another robot with phase $\theta_j$ can be produced tending to result in a motion vector bringing the robot and the other robot closer to one another. When the cosine term is negative, a repulsive term can be high and produce the greatest repulsive force in resulting motion vectors.

In some implementations, the input data can be interpreted as summation quantities over individual signals that are gain-modulated or visibility-normalized. For example, possible summed input calculations can include, for sensory cue inputs:

$$I_{c_i} = \frac{g_c}{\sum_k V_{ik}^c} \sum_{k=1}^{N_c} c_{ik}$$

reward inputs, $$I_{r_i} = \frac{g_r}{\sum_k V_{ik}^r} \sum_{k=1}^{N_r} W_{ik}^r r_{ik}$$

and recurrent swarming inputs, $$I_{q_i} = \frac{g_s}{\sum_j V_{ij}} \sum_{j=1}^{N_s} W_{ij} q_{ij}$$

where the parameter gains $g_c$, $g_r$, and $g_s$ can sum to 1. With bounded inputs, some implementations can apply linear rectification rather than a saturating nonlinearity to calculate post-synaptic activation for each robot.

In some implementations, the post-synaptic activation can be represented as:

$$p = [I_c + I_r + I_q]_+$$

as the remaining component for a Hebbian form of learning wherein the Hebbian form of learning can represent the correlated activation of pre- and post-synaptic neurons leading to a strengthening of the connection between two neurons. The robots in a system like the system 100 can be phase-coupled by the equation $\tau_q \dot{q}_{ij} = V_{ij} \cos(\theta_j - \theta_i) - q_{ij}$. Thus, in the same way that a spiking neuron can be reduced to a phase description of its orbit on the phase plane, p can be considered a driving force behind the internal phase state represented in item 109. In some implementations, the equation can be written as $\theta = \omega_0 + \omega_I p$.

In some implementations, $\omega_I$ sets the maximum increase in input-modulated angular frequency above the baseline frequency $\omega_0$. The net effect of the above stated mechanism is that robots have place-cell-like spatial tuning with phaser-cell-like phase coding and synchronization.

In stage B of FIG. 1, data from the weights of item 108 and the phases of item 109 are used to compute updated weights of the weight matrices W and $W^r$. A learning-based approach can be used to update the weight matrices W and $W^r$. A basic Hebbian rule such as, $dW_{ij} = \eta p_i q_j$ can cause weights to grow unbounded. An example of a more advantageous implementation can take the form of computing updated weights W' using the rule:

$$W_{ij}' = W_{ij} + \Delta t \eta V_{ij} p_i (q_{ij} - p_i W_{ij})$$

where $\Delta t$ is a simulation time-step and $\eta$ is a learning rate both of which effectuates a pre-synaptic normalization according to Oja's rule, or other rules (e.g., the Bienenstock-Cooper-Munro cortical learning rule), where multiplicative factors can be used to normalize and provide stability to aspects of Hebbian learning. A similar form can be used in some implementations to update feedforward weights $W^{r'}$ computed for a reward k:

$$W_{ij}^{r'} = W_{ij}^r + \Delta t \eta_r V_{ik}^r p_i (r_{ik} - p_i W_{ij}^r)$$

Alternative neuronal learning rules could be adapted into this framework.

An element can exist to limit the growth of particular connections. In some implementations, the element can be the subtractive element of the post-synaptic activation p that depresses the growth of overly active synapses. This behavior can be used to simulate the feedback inhibition typically used within a place-cell network model to more efficiently map an environment. The subtractive element can provide a similar repulsive role due to the distance-weight equivalence embedded in the given example of a weight matrix calculation.

In some implementations, the updated weights W and $W^r$ can be converted directly to desired distances by inverting the half-Gaussian swarming kernel in the form:

$$D_{ij}' = \sqrt{-2\sigma^2 \log W_{ij}'}$$

and the exponential reward kernel:

$$D_{ij}^{r'} = -\kappa \log W_{ij}^{r'}$$

To compute a resultant motion, the desired positional shift of a robot i is averaged across its visible neighbors. This can take the form:

$$f_i = \frac{1}{2 \sum_j V_{ij}} \sum_{j=1}^{N_s} V_{ij} (D_{ij}' - D_{ij}) \frac{x_j - x_i}{|x_j - x_i|}$$

where $x_j$ and $x_i$ can represent locations of two robots and the reward motion can be computed as the average:

$$f_i^r = \frac{1}{\sum_k V_{ik}^r} \sum_{k=1}^{N_r} V_{ik}^r (D_{ik}^{r'} - D_{ik}^r) \frac{x_k^r - x_i}{|x_k^r - x_i|}$$

where $x_k^r$ can represent locations of objectives. The net positional shift can be calculated as a linear combination of the swarm and reward related shifts:

$$\Delta x = \alpha f + (1-\alpha) f^r$$

In some implementations, $\alpha = 0.5$. Any value from 0 to 1, in the above implementation, can be used to bias the general motion of the robots toward objectives or toward swarming.

Barriers and other environmental boundaries or obstacles can influence movement as part of a barrier-aware positional shift. In some cases the form can be:

$$\Delta x_i^b = (1-\beta_{s_i})\Delta_{x_i} + \beta_{s_i}|\Delta x_i|n_{s_i}$$

where $\beta_s = \exp(-d/\lambda)$ can be an exponential kernel dependent on the distance d from a wall or a barrier and a buffer constant $\lambda$ which in some implementations can be 20 points. The normal vector to the nearest wall or barrier can be represented by $n_s$. The shifts can update the internal place-field locations $x_s \leftarrow x_s + \Delta x^b$ of each swarm robot such as the robot 102, 104, or 106.

Physical locations of the robots can be updated with instantaneous velocities for each robot to approach their internal place field locations. In some implementations, the form can be:

$$v_\mu = \mu v + (1-\mu)v_s$$

with the actual velocity, prior to updating, v and the coefficient $\mu$. The variable $v_s$ can represent an instantaneous velocity which in some implementations can take me form:

$$v_s = \frac{x_S - x}{\Delta t}.$$

In some cases, a maximum speed can be imposed by a saturating nonlinearity of the following form:

$$v_{max} = \sqrt{\frac{2E_{max}}{m}}$$

$$v_{k_i} = v_{max_i} \tanh\left(\frac{|v_{\mu_i}|}{v_{maxi}}\right)\frac{v_{\mu_i}}{|v_{\mu_i}|}$$

where m is robot mass and barrier avoidance can be expressed as:

$$v_i = (1-\beta_i)v_{k_i} + \beta_i|v_{k_i}|n_i$$

for proximity $\beta$ to the nearest wall or barrier, and normal vectors n to the nearest wall or barrier. Then robot locations can be updated by $x \leftarrow x + v\Delta t$.

In some implementations, singleton simulations can be constructed that are analogous to conventional models of neural networks in an animal such as a rat navigating a maze. Instead of having multiple robots, the above calculations can work for a single robot (such that N=1) which owns a collection of virtual or 'cognitive' swarming particles (such that, for example, $N_s=300$) that guide the robot's spatial behavior. The virtual swarm can provide the robot with various options for constructing a path through the environment.

In stage C, the motion vector 110 of the robot 102a is calculated from the updated weight matrices $W'$ and $W^{R'}$. The matrix such as $V^\delta \in \{0,1\}^{N_s}$ can indicate which particles' positions are visible to the robot and can serve to additionally mask learning updates in equations for updating the weights of the neural network. To produce motion, an equation of the following form can be used:

$$v_s = \frac{1}{\Delta t \sum_j V_j^\delta p_j^3} \sum_{i=1}^{N_s} V_i^\delta p_i^3 (x_{s_i} - x)$$

where $p_i$ and $p_j$ can represent post-synaptic activation and $x_s$ and x can represent the positions of the virtual swarm and the singleton robot, respectively. Taking the third power of $p_i$ in this calculation is one example of a nonlinearity with respect to activation levels that can be used to implement the singleton robot's motion. In this way, the robot can construct a path towards the most highly activated swarm particles that occupy positions that are visible to the singleton robot.

In stage D, the calculated motion vector from item 110 is processed by the robot 102a. The arrow 112 represents the motion vector in relation to the scenario of FIG. 1. In some instances, the vector 112 can be calculated to decrease a distance between nearby robots 104a and 106a or increase a distance between nearby robots 104a and 106a. Alternatively, or in addition, the vector 112 can also be calculated to decrease a distance to the objective 107a. In some cases, the type of assignment can influence the effects of a particular motion vector. For example, an assignment can be given by a control station or other user to have one or more robots track a car. In this assignment, some implementations may prioritize maintaining a proximity to the car.

The process of calculating motion vectors for the robot 104a and robot 106a can be similar to the process shown above for calculating a motion vector for the robot 102a. In some implementations, differences of calculations between robots of the same system can be used. For example, two robots of the system 100 need not have the exact same process of generating motion vectors. The robot 104a may be programmed specifically for satisfying the reward segment of the above calculations while 106a may be programmed specifically for satisfying the swarming segment of the above calculations. In this way, robots can perform different tasks within a particular assignment or within a system. This task specialization can be achieved in some implementations by changing the value of the motion bias a for each robot.

In stage E, the robots 102, 104, and 106 have moved, represented by items 102b, 104b, and 106b. In some cases, the new location can represent the effect of a calculated motion vector in the form of the process described above. Subsequent movements can be instigated by repeating again what began at stage A and includes obtaining inputs from visible robots, calculating weights, determining phase, or calculating motion vectors. Further calculations can be made by components of the system 100.

Figure 2:
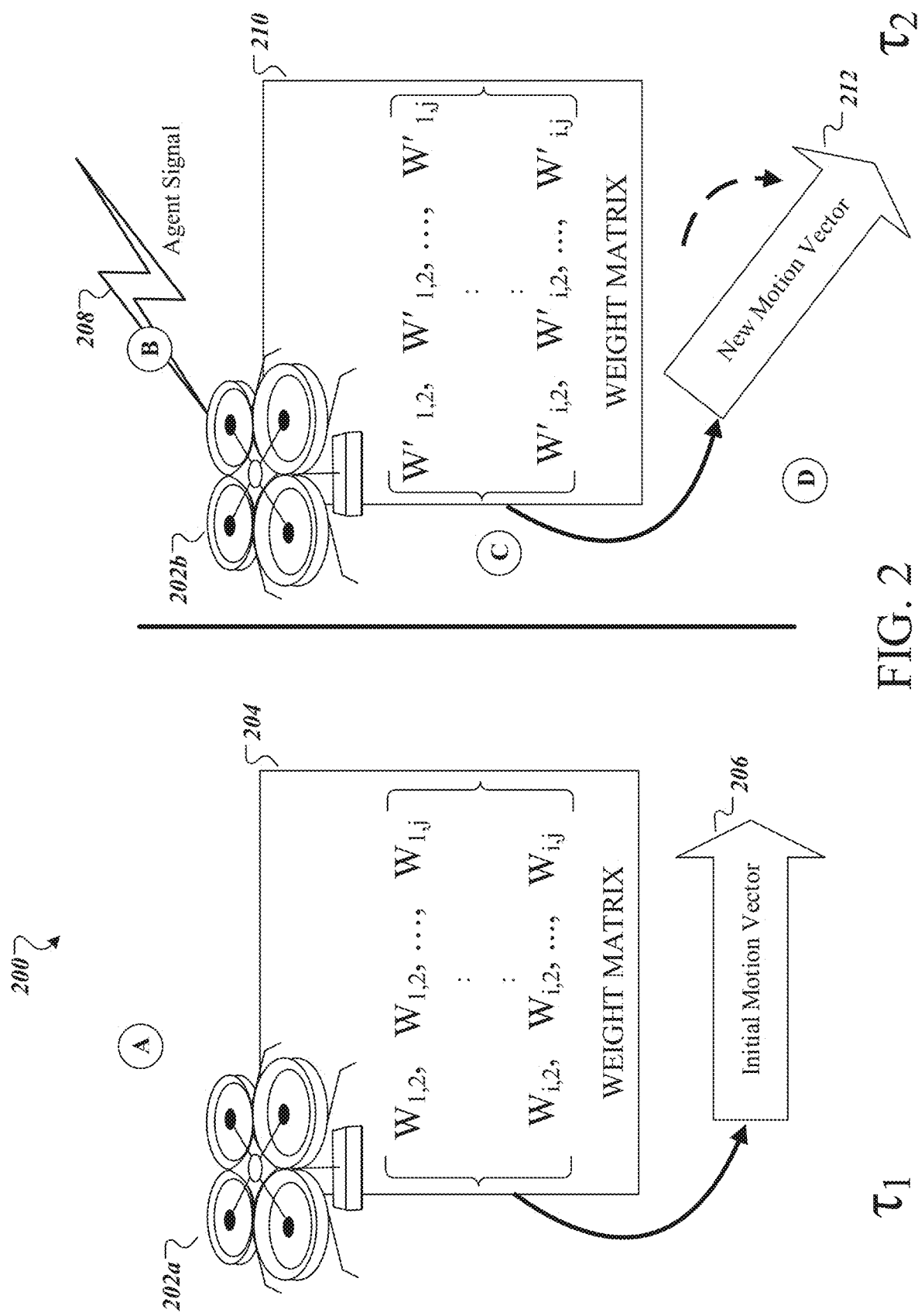
FIG. 2 is a diagram showing an example of a motion vector update.

FIG. 2 is a diagram showing an example of a motion vector update for a system 200. The device 202 is shown at times $\tau_1$ and $\tau_2$ with an example matrix shown in item 204 and item 210 and motion vector 206 and 212.

In some implementations, the device 202 can be a type of robot. The device 202 can be autonomous (e.g., quad-copter drones, rovers, etc.) or semi-autonomous (e.g., drones, vacuum cleaners, rovers, etc.) robots or devices that are not autonomous (e.g., refrigerator that can broadcast location, a sensor in a road, a beacon on a skyscraper, etc.). For example, the device 202 can be an autonomous drone. The device 202 can be within the system 200 composed of other devices. For example, a number of other devices able to communicate with the device 202 can be visible to the device 202.

In some implementations, devices (autonomous, semi-autonomous, or non-autonomous) can be used within motion determination. For example, if a refrigerator is visible to a robotic vacuum cleaner, then the robot vacuum can get position information broadcast by the refrigerator and generate a motion vector.

In stage A, the device 202a is associated with weight matrix 204 and the initial motion vector 206. At a particular time $\tau_1$ the device 202a can be associated with other data stored either within the device 202a or within another storage device able to connect with the device 202a.

In stage B, at some point after time $\tau_1$, within a time $\tau_2$, the device 202b receives a signal 208 from another device able to communicate with the device 202b. The signal 208 can represent data from one or multiple devices. For example, the signal 208 can contain information on the visibility, distance, and internal phase of three devices near the device 202b.

In stage C, based on data including the signal 208, the device 202b can adjust the weight matrix shown in item 210. The adjustment is shown with a prime symbol attached to the weight matrix such that the change can be expressed as W→W'.

In some implementations, changes of the weight matrix 204 can be made based on calculations done within the device 202 or within another component of the system 200. For example, a neighboring device can handle a portion of the updates.

In stage D, a new motion vector 212 is calculated based on the weight matrix 210 along with other data. The process of calculating the vector 212 can proceed in a similar manner to the process explained in the description for FIG. 1.

In some implementations, other devices in the system 200 can update motion vectors. For example, a device that sent information to the device 202b, can update the motion vector of the device based on the new motion vector 212 of the device 202b.

Figure 3:
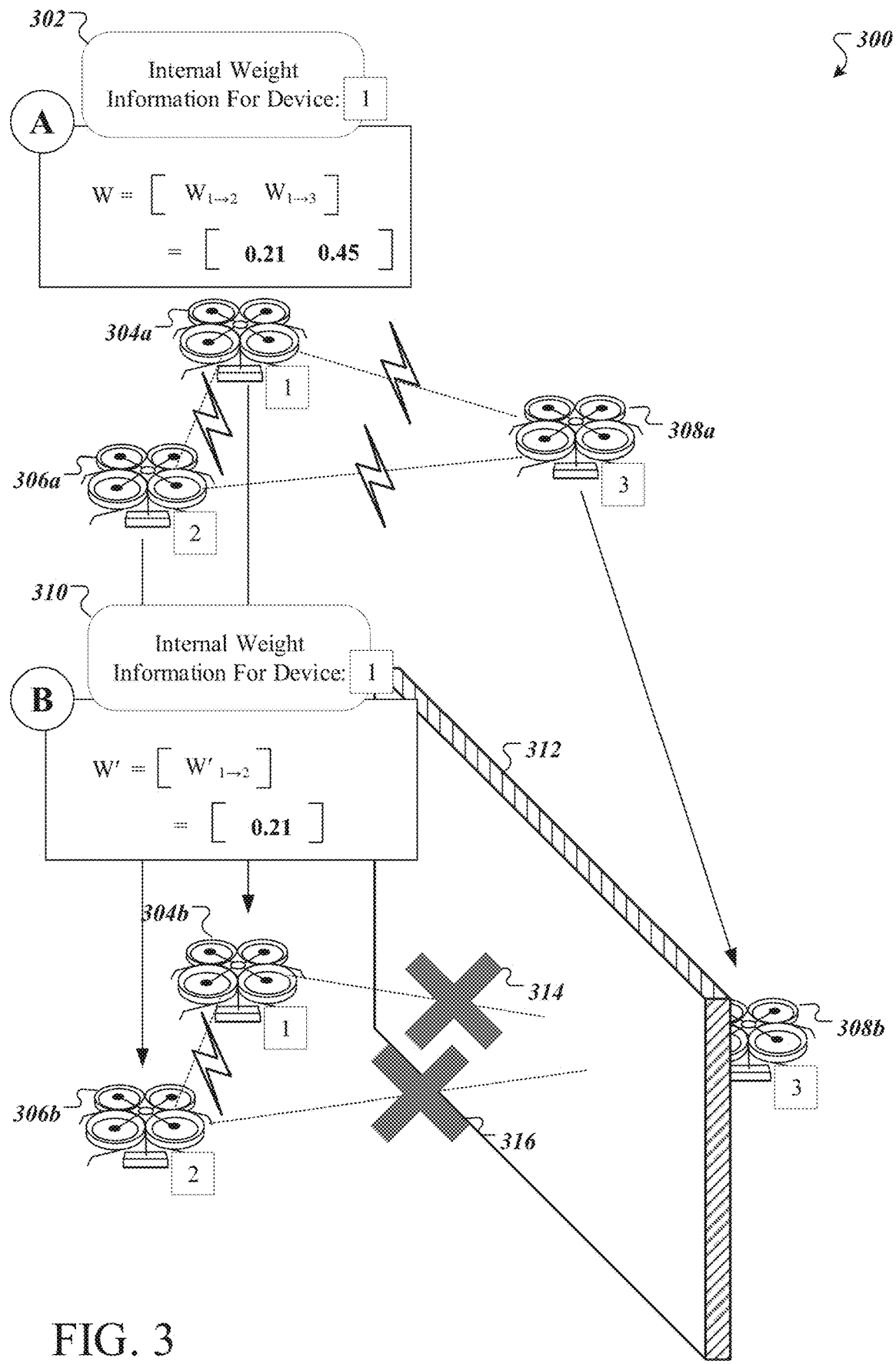
FIG. 3 is a diagram showing an example of device visibility.

FIG. 3 is a diagram showing an example of device visibility. The system 300 is comprised of a method of data storage represented by the item 302 as well as a number of devices. The devices 304, 306, and 308 are shown at one time as 304a, 306a, and 308a, respectively, and at a later time, after movement, as 304b, 306b, and 308b.

In stage A, the internal weights for the device 304a are shown in item 302. The matrix shown is that of the robot-based weights which, in some implementations, can be defined as:

$$W_{ij} = V_{ij} \exp(-D_{ij}^2/\sigma^2)$$

where inter-robot visibility is defined by $V^R \in \{0,1\}^{N_S \times N_S}$ inter-robot distances are defined by D, and a spatial constant is defined by $\sigma$. The visibility matrix V can be a multiplicative factor depending on whether or not a robot can make contact with another robot. If the robot can make contact with another robot, the multiplicative factor is 1 and the weight representing the connection between the robot and another robot can exist as a non-zero number. If the robot cannot make contact with another robot, the multiplicative factor is 0 and the weight representing the connection between the robot and another robot is zero. In some implementations, zero terms can be not saved or otherwise ignored in a system such as the system 300.

Item 302 shows the values associated with weights where $W_{1 \to 2}$ corresponds to the connection from robot 304a to robot 306a and $W_{1 \to 3}$ corresponds to the connection from robot 304a to robot 308a. In this example, the values are: $W_{1 \to 2}=0.21$ and $W_{1 \to 3}=0.45$ In stage B, the robots 304a, 306a, and 308a move to new locations. The new locations are represented by 304b, 306b, and 308b. The new internal weight information is shown in item 310. Items 314 and 316 illustrate the effect of the obstruction 312 within the system 300. In this case, the obstruction 312 prevents the robot 304b from communicating with the robot 308b. This results in the weight $W_{1 \to 3}$ being deleted from the weight matrix once the robot 308b is behind the obstruction 312. The weight $WW_{1 \to 2}$ remains 0.21. In some implementations, more than one value can be affected from one time to a later time.

The connection between the robot 306b and the robot 308b is prevented by the obstruction 312. In this case, the weight matrix for 306b, not shown, could also lose values. The connection between the robot 308b and the robots 304b and 306b is prevented by the obstruction 312. In this case, the weight matrix for 308b, not shown, could also lose values.

In some implementations, if a device loses contact with another device, a responsive action can result. For example, if the robot 308b loses all connections, a protocol can exist to automatically reverse the current motion vector in an attempt to regain connection. In some cases, the device can predict where reconnection can be viable and proceed to that location. For example, if traveling through a tunnel, a device loses connection with another device, the device may predict that connection can be reestablished at the end of the tunnel and so continue to the end of the tunnel.

In some implementations, weights may be added when a robot comes into contact with another robot. For example, if the robot 308b, having already been deleted from the weight matrix W' of the robot 304b, were to move from behind the obstruction 312 and reestablish contact with the robot 304b, the robot 308b could add a weight value to the weight matrix of the robot 308b and the robot 304b could add a weight value to the weight matrix of the robot 304b.

A robot which had not previously been associated within the weight matrix of another robot can be added. For example, if the robot 308b was never associated with the weight matrix of 304b and moved from behind the obstruction 312 and established contact with the robot 304b, the robot 304b can add a weight value representing the robot 308b.

In some implementations, a central station or server can aid in maintaining a weight matrix for a device. For example, instead of being stored within a data storage device on the robot 304b, a central station or another component of the system 300 could help maintain the values.

In some implementations, calculations involved in the motion of a device can be performed on a central station or server. For example, the motion vector process from the explanation of FIG. 1 can be performed on a central station or server with results or other data communicated to the robot 304b.

FIG. 4 is a flow diagram illustrating an example of a process for swarming technology. The process 400 may be performed by one or more electronic systems, for example, the system 100 of FIG. 1.

The process 400 includes determining a synaptic weight in a neural network which represents a distance from a robot to another robot for one or more robots (402). If only one robot exists, or a robot cannot communicate with any other robot, the weight matrix can be empty. An example of robot-to-robot synaptic weights can be found in FIG. 1 item 108 where the variable W corresponds with the structure holding the synaptic weights corresponding to the distances between the robot 102a and 104a and the distance between the robot 102a and 106a.

The process 400 includes determining a synaptic weight in the neural network which represents a distance between the robot and an objective, for one or more robots (404). If no objective or reward exists, or is not a part of a robot's protocol, the objective weight matrix can be empty. An example of robot-to-objective synaptic weights can be found in FIG. 1 item 108 where the variable $W^R$ corresponds with the structure holding the synaptic weight corresponding to the distance between the robot 102*a* and the objective 107*a*.

The process 400 includes collecting phase information of the one or more robots (406). For example, the item 109 of FIG. 1 shows the internal phase of the robots 102*a*, 104*a*, and 106*a*.

The process 400 includes updating the synaptic weights using the neural network and phase information (408). For example, the update could involve a calculation of the form $W_{ij}'=W_{ij}+\Delta\eta V_{ij}p_i(q_{ij}-p_iW_{ij})$ for the robot-based synaptic weights or $W_{ij}^{r\prime}=W_{ij}^{r}+\Delta\eta_r V_{ik}^{r}p_i(r_{ik}-p_iW_{ik}^{r})$ for the objective-based synaptic weights. For more information, see above discussion.

The process 400 includes determining a motion vector that defines movement for the robot based on the updated synaptic weights (410). For example, the determination of the motion vector could involve a calculation of the form:

$$v_s = \frac{1}{\Delta t \sum_j V_j^\delta p_j^3} \sum_{i=1}^{N_S} V_i^\delta p_i^3 (x_{s_i} - x)$$

The process 400 includes adjusting a current location of the robot to a subsequent location based on the determined motion vector (412). For example, the robot 102 of FIG. 1 moves from a location represented by 102*a* to a location represented by 102*b* between a time $\tau_1$ and $\tau_2$. The movement can be a result of the calculated motion vector 112.

Figure 5:
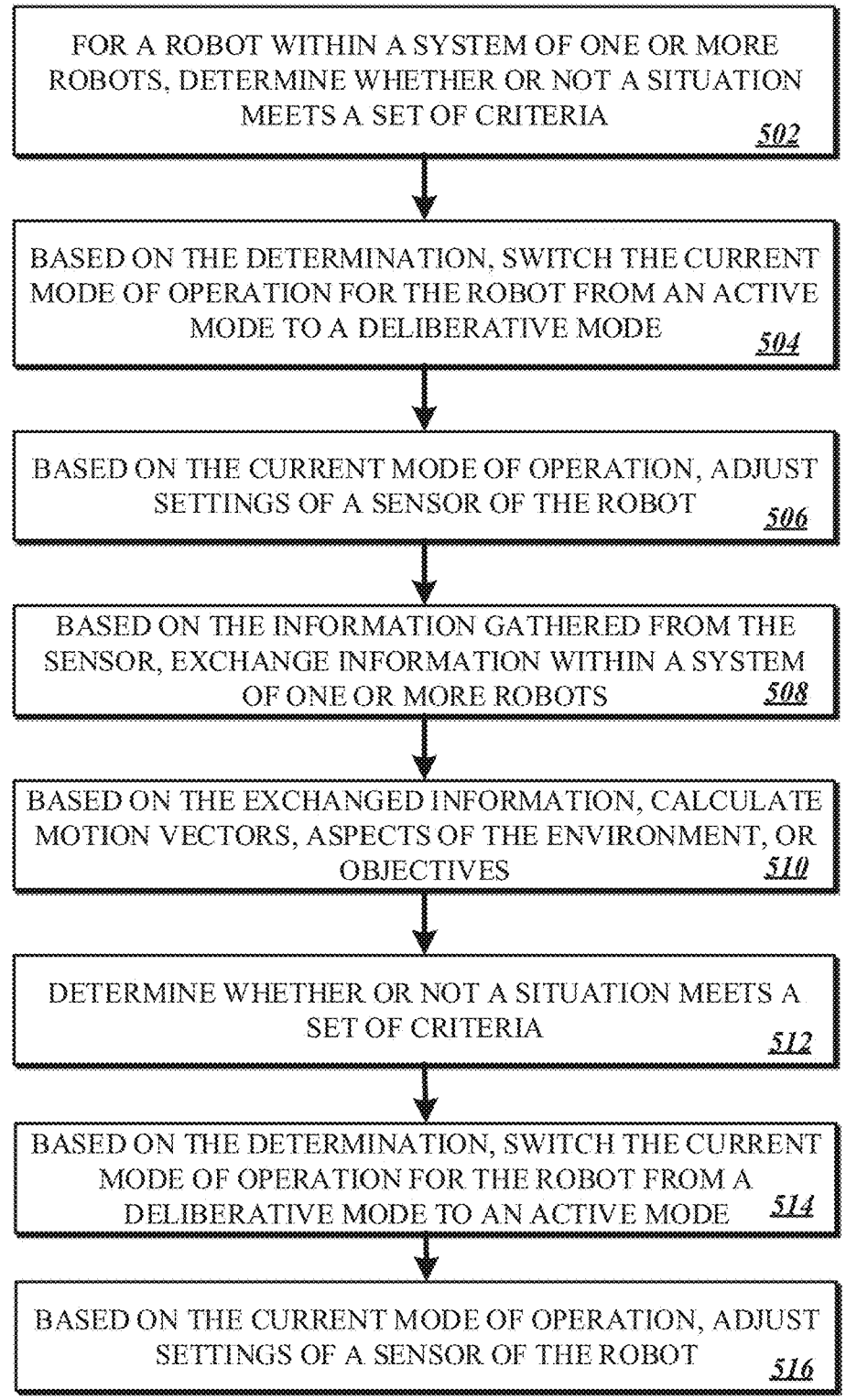
FIG. 5 is a flow diagram illustrating an example of a process for swarming technology.

FIG. 5 is a flow diagram illustrating an example of a process for swarming technology. The process 500 may be performed by one or more electronic systems, for example, the system 100 of FIG. 1.

The process 500 includes determining whether or not a situation meets a set of criteria for a robot within a system of one or more robots (502). For example, a robot could perceive, with visual sensors that a tree has fallen and now presents a barrier to an objective.

The process 500 includes switching the current mode of operation for the robot from an active mode to a deliberative mode based on the determination (504). For example, if the tree falling was sufficient to meet the criteria within the system, the robot could switch to a different mode to deal with the new situation.

The process 500 includes adjusting settings of a sensor of the robot based on the current mode of operation (506). For example, the robot could increase the sensitivity of microphones on-board. The robot could also relax possible constraints for visual analysis to help interpret possible new objects within a perceptual radius.

The process 500 includes exchanging information within a system of one or more robots based on the information gathered from the sensor (508). For example, a sharp wave or other oscillatory form could propagate amongst the system of one or more robots.

The process 500 includes calculating motion vectors, aspects of the environment, or objectives based on the exchanged information (510). For example, a motion vector similar to the item 112 of FIG. 1 can be updated based on the exchanged information. The motion vector could be set to have the robot fly over the tree which had fallen.

The process 500 includes determining whether or not a situation meets a set of criteria (512). For example, after the robot has flown over the tree, the robot can reassess the situation.

The process 500 includes switching the current mode of operation for the robot from a deliberative mode to an active mode based on the determination (514). For example, if a path beyond the tree which had fallen is similar to a familiar task, the robot can return to an active or steady state.

The process 500 includes adjusting settings of a sensor of the robot based on the current mode of operation (516). For example, if the sensor sensitivity had been increased while in a deliberative state, the sensor sensitivity can be decreased back to original levels based on a current mode of operation or other situational cues such as visual signs or instructions. In some implementations, adjusting sensor settings can constitute switching between modes. For example, if the sensitivity of a sensor on a robot is increased, the robot can be considered to be in a deliberative mode.

In some implementations, a situation encountered which provokes a switch to a deliberative mode can be subdivided. For example, a situation may be completely novel in which case a robot can model imagined experiences before executing actions. A situation may also be somewhat familiar in which case, models of prior experience can be used to help inform models of imagined experience.

In some implementations, once a model of experience is created, certain safe actions can be executed in an exploratory mode. For example, if a robot determined that a model of experience would inform the motion of flying over the fallen tree, it can first perform certain safe actions which can be actions that a system has deemed safe in a variety of circumstances. For example, the robot could rotate the camera on-board to detect alternate views or move slowly along a particular motion vector.

In some implementations, specific oscillation types can be used within a system of one or more robots to exchange information. For example, sharp waves (and associated 'ripple' oscillations) can be used in the deliberative mode for long term learning. Sharp waves can also be task-modulated and can help predict future behavior as well as cover unexplored territory in an environment. Future-oriented, or planning, sequences tend to activate a small number of discrete locations within a mammalian brain leading to a destination which can be similar to the energy minima of an attractor map. Spatial sequences can also depend on synaptic plasticity due to NMDA receptors which can be modeled in versions of hippocampal sequence learning.

A sharp wave can be concurrent with gamma oscillations within a system. In some implementations, a network of place fields (e.g., with a Poisson distribution of field locations) can create a non-uniform energy landscape that facilitates the ability of sharp wave/ripples to generate new sequences to goals, short-cuts, or adaptively avoid obstacles. Obstacles can be new or pre-existing within an environment. In some implementations, an explicit theoretical framework that unifies sharp wave sequences with realistic hippocampal spatial maps can be used within a group, or swarm, of robots. Initiator cells of a sharp wave within a mammalian brain can be taken as analogous to local subgroups of agents that have become highly excited due to changes in the environment or task. In this way, a small group of agents, or robots, clustered at an attractor point, may initiate broadcasts of critical information to the rest of the swarm.

In some implementations, robots, agents, or devices within a swarm can be used to help a single entity. For example, one or more drones can fly ahead of a person, object, or robot to determine the environment around the person, object, or robot. The data gathered by the one or more drones can be used by the person, object, or robot to complete tasks or navigate within an environment.

In some implementations, the robots within a group can vary in size. For example, a group of robots can be small enough to work within the body of a human or other creature. The group of robots can be used for a variety of tasks. For example, the group of robots can be used to help treat or remove tumors or other ailments. In general, a robot within a group of robots can be of any size.

In some implementations, a robot within a group of robots can be used in satellite systems. For example, a robot can be a small satellite which can work with other devices, which in some cases can be other satellites, to accomplish tasks.

A number of implementations have been described. Nevertheless, it will be understood that various modifications may be made without departing from the spirit and scope of the disclosure. For example, various forms of the flows shown above may be used, with steps re -ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine -readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

The invention claimed is:

1. A method for decentralized robot swarm navigation, the method comprising:
for each particular robot of the swarm:
determining a plurality of robot-based synaptic weights within a neural network, wherein each of the plurality of robot-based synaptic weights represents a distance based relationship between the particular robot and another robot of the swarm that is visible to the particular robot;
determining a plurality of objective-based synaptic weights within the neural network, wherein each of the objective-based synaptic weights represent a distance based relationship between the particular robot and an objective;
updating the plurality of robot-based synaptic weights and objective-based synaptic weights using the neural network and additional data, wherein the additional data is comprised of oscillating signals from at least one robot;
determining a motion vector that defines movement for the particular robot based on the updated weights; and
adjusting a current location of the particular robot to a subsequent location based on the determined motion vector.

2. The method of claim 1, wherein the other robot is visible to the particular robot of the robot swarm if electronic signals can be exchanged between the other robot and the particular robot.

3. The method of claim 1, wherein a robot-based synaptic weight of the plurality of robot -based synaptic weights that represents a connection between the other robot and the particular robot can be added in instances where the other robot moves from being non-visible to the particular robot to visible to the particular robot and a robot-based synaptic weight of the plurality of robot based synaptic weights can be deleted in instances where the other robot moves from being visible to the particular robot to non-visible to the particular robot.

4. The method of claim 1, wherein the plurality of robot-based synaptic weights are stored within the particular robot of the swarm.

5. The method of claim 1, wherein a location independent relationship is used in determining the plurality of synaptic weights.

6. The method of claim 1, the method further comprising:
determining, by the particular robot and using the determined motion vector, a path towards a most highly activated visible particle in a model that is internal to or computed on behalf of the particular robot.

7. The method of claim 1, wherein the particular robot receives data from an entity outside of the robot swarm and uses the data in determining motion.

8. A system for decentralized robot swarm navigation comprising:
one or more computers and one or more storage devices storing instructions that are operable, when executed by the one or more computers, to cause the one or more computers to perform operations comprising:
for each particular robot of the swarm:
determining a plurality of robot-based synaptic weights within a neural network, wherein each of the plurality of robot-based synaptic weights represents a distance based relationship between the particular robot and another robot of the swarm that is visible to the particular robot;
determining a plurality of objective-based synaptic weights within the neural network, wherein each of the objective-based synaptic weights represent a distance based relationship between the particular robot and an objective;
updating the plurality of robot-based synaptic weights and objective-based synaptic weights using the neural network and additional data, wherein the additional data is comprised of oscillating signals from at least one robot;
determining a motion vector that defines movement for the particular robot based on the updated weights; and
adjusting a current location of the particular robot to a subsequent location based on the determined motion vector.

9. The system of claim 8, wherein the other robot is visible to the particular robot of the robot swarm if electronic signals can be exchanged between the other robot and the particular robot.

10. The system of claim 8, wherein a robot-based synaptic weight of the plurality of robot -based synaptic weights that represents a connection between the other robot and the particular robot can be added in instances where the other robot moves from being non-visible to the particular robot to visible to the particular robot and a robot-based synaptic weight of the plurality of robot based synaptic weights can be deleted in instances where the other robot moves from being visible to the particular robot to non-visible to the particular robot.

11. The system of claim 8, wherein the plurality of robot-based synaptic weights are stored within the particular robot of the swarm.

12. The system of claim 8, wherein the additional data contains oscillating signals that are location independent.

13. The system of claim 8, wherein a location independent relationship is used in determining the plurality of synaptic weights.

14. The system of claim 8, the operations further comprising:
  determining, by the particular robot and using the determined motion vector, a path towards a most highly activated visible particle in a model that is internal to or computed on behalf of the particular robot.

15. The system of claim 8, wherein the particular robot receives data from an entity outside of the robot swarm and uses the data in determining motion.

16. A non-transitory computer-readable medium storing software comprising instructions executable by one or more computers which, upon such execution, cause the one or more computers to perform operations comprising:
  for each particular robot of the swarm:
    determining a plurality of robot-based synaptic weights within a neural network, wherein each of the plurality of robot-based synaptic weights represents a distance based relationship between the particular robot and another robot of the swarm that is visible to the particular robot;
    determining a plurality of objective-based synaptic weights within the neural network, wherein each of the objective-based synaptic weights represent a distance based relationship between the particular robot and an objective;
    updating the plurality of robot-based synaptic weights and objective-based synaptic weights using the neural network and additional data, wherein the additional data is comprised of oscillating signals from at least one robot;
    determining a motion vector that defines movement for the particular robot based on the updated weights; and
    adjusting a current location of the particular robot to a subsequent location based on the determined motion vector.

17. The computer-readable medium of claim 16, wherein a robot-based synaptic weight of the plurality of robot-based synaptic weights that represents a connection between the other robot and the particular robot can be added in instances where the other robot moves from being non-visible to the particular robot to visible to the particular robot and a robot-based synaptic weight of the plurality of robot based synaptic weights can be deleted in instances where the other robot moves from being visible to the particular robot to non-visible to the particular robot.

18. The computer-readable medium of claim 16, wherein the plurality of robot-based synaptic weights are stored within the particular robot of the swarm.

19. The computer-readable medium of claim 16, the operations further comprising:
  determining, by the particular robot and using the determined motion vector, a path towards a most highly activated visible particle in a model that is internal to or computed on behalf of the particular robot.

20. The computer-readable medium of claim 16, wherein the particular robot receives data from an entity outside of the robot swarm and uses the data in determining motion.

* * * * *